(12) United States Patent
Smoot et al.

(10) Patent No.: US 7,953,928 B2
(45) Date of Patent: May 31, 2011

(54) APPARATUS AND A METHOD TO MAKE DATA SETS CONFORM TO DATA MANAGEMENT POLICIES

(75) Inventors: Peter L. Smoot, San Jose, CA (US); Jim Holl, Los Gatos, CA (US); Sahn Lam, Sunnyvale, CA (US); Anawat Chankhunthod, Saratoga, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 770 days.

(21) Appl. No.: 11/710,190

(22) Filed: Feb. 22, 2007

(65) Prior Publication Data
US 2008/0208917 A1   Aug. 28, 2008

(51) Int. Cl.
G06F 12/00 (2006.01)
(52) U.S. Cl. .......... 711/114; 707/999.201; 707/999.202; 707/999.204
(58) Field of Classification Search .................. 711/114; 707/201, 202, 204, 999.201, 999.202, 999.204
See application file for complete search history.

(56) References Cited

U.S. PATENT DOCUMENTS

| | | | |
|---|---|---|---|
| 5,412,661 A | 5/1995 | Hao et al. | |
| 5,602,702 A | 2/1997 | Maegawa et al. | |
| 5,617,527 A | 4/1997 | Kressin et al. | |
| 5,774,720 A | 6/1998 | Borgendale et al. | |
| 5,867,686 A | 2/1999 | Conner et al. | |
| 6,295,594 B1 | 9/2001 | Meier | |
| 6,463,470 B1 | 10/2002 | Mohaban et al. | |
| 6,640,278 B1 | 10/2003 | Nolan et al. | |
| 6,950,818 B2 | 9/2005 | Dennis et al. | |
| 6,983,303 B2 | 1/2006 | Pellegrino et al. | |
| 7,062,628 B2 | 6/2006 | Amano | |
| 7,392,234 B2 | 6/2008 | Shaath et al. | |
| 2002/0019908 A1 | 2/2002 | Reuter et al. | |
| 2002/0083216 A1 | 6/2002 | Hickson et al. | |

(Continued)

FOREIGN PATENT DOCUMENTS

EP   1693757   8/2006

(Continued)

OTHER PUBLICATIONS

"Network Appliance Powers Up the Storage Grid—World's First Dynamic Viftualization Engine Can Double Storage Utilization, Unleashes Performance-Driven Applications, and Reduces Storage Management Costs", downloaded from http://www.cimdata.com/newsletter/2004/46/01/46.01.02.htm, Nov. 15, 2004, 2 pages.

(Continued)

*Primary Examiner* — Kevin L Ellis
*Assistant Examiner* — Mehdi Namazi
(74) *Attorney, Agent, or Firm* — Blakely, Sokoloff, Taylor & Zafman LLP (57) ABSTRACT

An apparatus and a method to make data sets conform to data management policies are presented. In one embodiment, the apparatus includes a conformance checker and a conformance engine. The conformance checker may be operable to compare a state of a data set against a data management policy associated with the data set to determine if the data set currently conforms to the data management policy. The conformance engine may then make the data set conform to the data management policy if the conformance checker determines that the data set currently violates the data management policy.

21 Claims, 7 Drawing Sheets

U.S. PATENT DOCUMENTS

| | | | |
|---|---|---|---|
| 2002/0178249 A1 | 11/2002 | Prabakaran et al. | |
| 2002/0188592 A1 | 12/2002 | Leonhardt et al. | |
| 2002/0191619 A1 | 12/2002 | Shafer | |
| 2003/0225800 A1 | 12/2003 | Kavuri | |
| 2004/0019587 A1* | 1/2004 | Fuh et al. | 707/2 |
| 2004/0133718 A1 | 7/2004 | Kodama et al. | |
| 2004/0267766 A1* | 12/2004 | Marek et al. | 707/100 |
| 2004/0268298 A1 | 12/2004 | Miller et al. | |
| 2005/0033757 A1* | 2/2005 | Greenblatt et al. | 707/100 |
| 2005/0060693 A1 | 3/2005 | Robison et al. | |
| 2005/0160428 A1 | 7/2005 | Ayachitula et al. | |
| 2005/0193231 A1* | 9/2005 | Scheuren | 714/5 |
| 2006/0029097 A1 | 2/2006 | McGee et al. | |
| 2006/0136368 A1* | 6/2006 | Young-Lai et al. | 707/2 |
| 2006/0167858 A1 | 7/2006 | Dennis et al. | |
| 2007/0098014 A1 | 5/2007 | Pomaranski et al. | |
| 2007/0156670 A1 | 7/2007 | Lim | |
| 2007/0156694 A1 | 7/2007 | Lim | |
| 2007/0268822 A1* | 11/2007 | Brunswig et al. | 370/229 |
| 2008/0066149 A1 | 3/2008 | Lim | |
| 2008/0098453 A1* | 4/2008 | Hinton et al. | 726/1 |
| 2008/0120459 A1 | 5/2008 | Kaneda et al. | |
| 2008/0215843 A1 | 9/2008 | Nasu et al. | |
| 2008/0263112 A1 | 10/2008 | Shaath et al. | |
| 2009/0222882 A1 | 9/2009 | Kabat et al. | |

FOREIGN PATENT DOCUMENTS

| | | |
|---|---|---|
| WO | WO 92/17838 | 10/1992 |
| WO | WO 2004/109443 | 12/2004 |

OTHER PUBLICATIONS

"Introduction to Data ONTAP 7G", Network Appliance, Inc., Oct. 2005, pp. 32 pages.

* cited by examiner

APPARATUS AND A METHOD TO MAKE DATA SETS CONFORM TO DATA MANAGEMENT POLICIES

TECHNICAL FIELD

The present invention relates to networked data storage systems, and more particularly, to managing data storage using data sets.

BACKGROUND

A networked data storage system can be used for a variety of purposes, such as providing multiple users access to shared data, or facilitating backups or data mirroring. A networked storage system may include a number of storage servers. A storage server may provide services related to accessing and organizing data on mass storage devices, such as disks. Some storage servers are commonly referred to as filers or file servers, as these storage servers provide file-level access to data. Some of these filers further provide clients with sub-file level access to data (e.g., block-level access). An example of such a storage server is any of the Filer products made by Network Appliance, Inc. in Sunnyvale, Calif. The storage server may be implemented with a special-purpose computer or a general-purpose computer programmed in a particular way. Depending on the application, various networked storage systems may include different numbers of storage servers.

Logical units of storage may be created and manipulated on storage servers, such as files, directories, volumes, logical unit numbers (LUNs). Such logical units are referred to as storage objects in this document. Creating a single storage object is typically fast and easy, but managing a storage object over time can be difficult. A storage administrator has to make numerous decisions, such as how to monitor the available space for the storage object, how to schedule data backups, how to configure backups, whether the data should be mirrored, where data should be mirrored, etc. Answers to the above questions may be provided in a data management policy, and once this policy is decided, the administrator needs to ensure that the policy is correctly implemented on all relevant storage objects, that the required space is available, that the data protection operations succeed, and so forth. If the administrator decides to change the policy (for example, extending the amount of time that backups should be retained), the administrator has to find all the affected storage objects and then manually reconfigure all the relevant settings.

As the number of storage objects grows in the system, the administrator's job becomes more difficult and complex. It becomes increasingly likely that the administrator may not readily determine what policy is supposed to apply to a given storage object, or why a given volume is mirrored. In addition, the administrator has to perform many tedious manual operations for each storage object, which can be error prone and unreliable. Thus, a storage administrator needs help tracking what storage objects exist in a storage system, how the storage objects relate to other objects, and which policy should be applied to the storage objects.

Other important challenges for storage administrators include deciding how to manage their storage infrastructure and ensuring that their storage systems are managed in the way they have decided. The first challenge is the problem of deciding on a data management policy. The storage administrators have a plethora of choices to make when deciding on a policy. They need to decide how often to back up data, how long to retain the back up copies, whether to use local snapshots to provide local backups, whether to mirror storage objects, and so forth. Typically, one way to manage the data depends on what type of data it is, and how important the data is. For example, the data for a mission-critical product order database requires a different data management policy from the home directories of ex-employees.

Once an administrator has defined a data management policy, the policy has to be described or encoded in such a way that other administrators can understand and carry out the policy. This description is often in the form of an operation manual written in a natural language commonly used in human communication, such that the description can be read and interpreted by other members of the storage management staff. Currently, there is no automated implementation of a policy written in this form. Furthermore, there is currently no way to automatically audit a data center and find storage objects that are not being managed in compliance with the policy. Conventionally, administrators write ad-hoc tools and/or use ad-hoc queries to monitor the storage environment and to look for discrepancies between the policy and the states of storage objects. If the administrators find a discrepancy, they have to manually decide what actions to take to correct the situation. This takes so much time and is so error prone that most large data centers have little confidence on whether they are managing their data in accordance with their data management policies.

SUMMARY

The present invention includes an apparatus and a method to make data sets conform to data management policies. In one embodiment, the apparatus includes a conformance checker and a conformance engine. The conformance checker may be operable to compare a state of a data set against a data management policy associated with the data set to determine if the data set currently conforms to the data management policy. The conformance engine may then make the data set conform to the data management policy if the conformance checker determines that the data set currently violates the data management policy.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

An apparatus and a method to automatically make data sets conform to data management policies are described. In the following description, numerous specific details are set forth. However, it is understood that embodiments of the invention may be practiced without these specific details. In other instances, well-known components, structures, and techniques have not been shown in detail in order not to obscure the understanding of this description.

In one embodiment, the apparatus includes a conformance checker and a conformance engine. The conformance checker is operable to compare a state of a data set against a data management policy associated with the data set to determine if the data set conforms to the data management policy. The conformance engine then makes the data set conform to the data management policy if the conformance checker determines that the data set violates the data management policy. Using the conformance checker and the conformance engine described herein provides great convenience to storage administrators, because the data sets can be checked automatically and frequently without imposing much burden on the administrators. More details about the data sets, storage objects, data management policy, conformance checker, and conformance engine are discussed below.

System Overview

Figure 1:
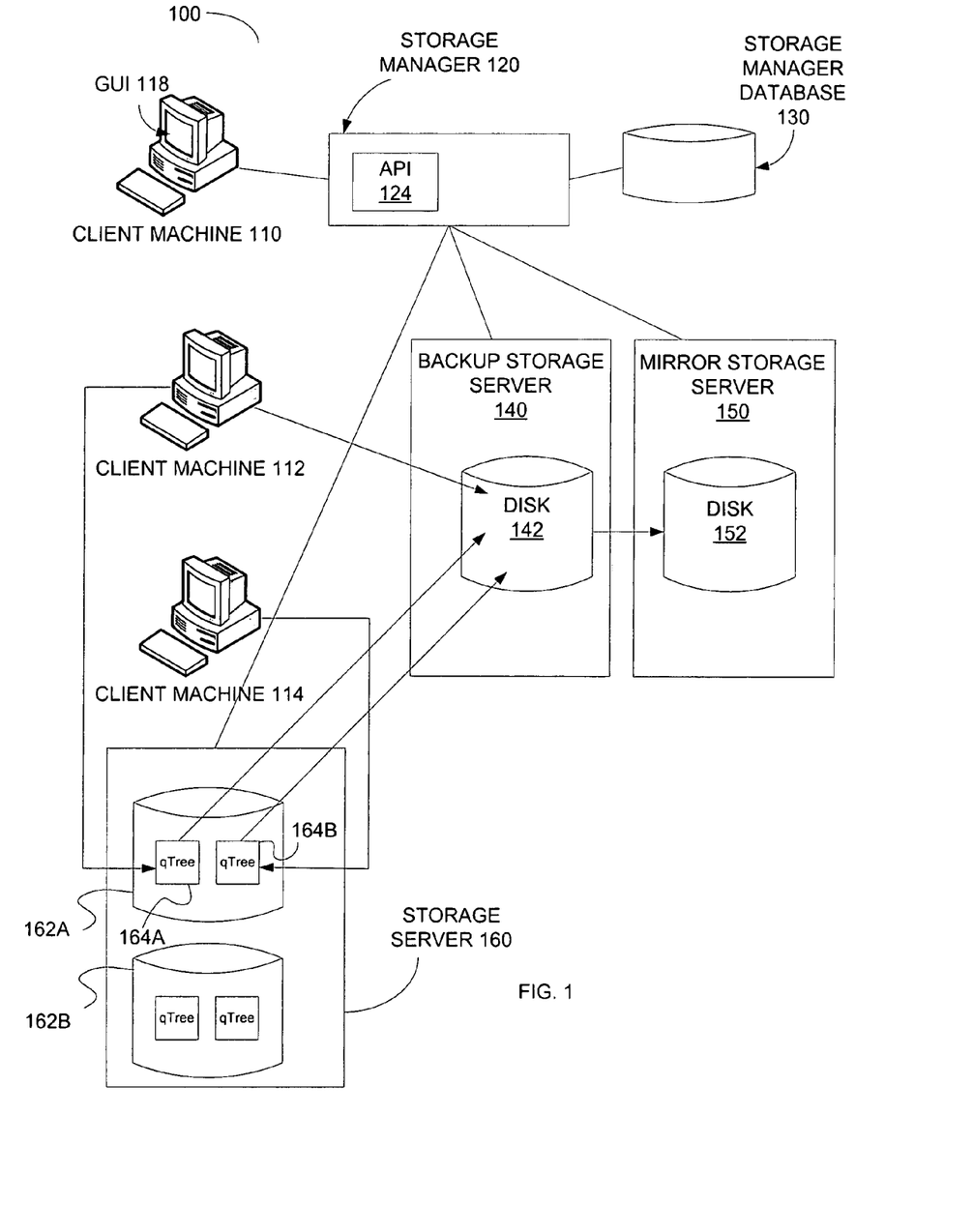
FIG. 1 illustrates an embodiment of a networked storage system.

FIG. 1 shows a networked data storage system 100 according to some embodiments of the present invention. The system 100 includes client machines 110, 112, and 114, a storage manager 120, a storage manager database 130, a storage server 160, a backup storage server 140, and a mirror storage server 150. The above components can be coupled to each other through one or more networks of various types, such as local area network (LAN), wide area network (WAN), etc. Moreover, the network connections may be wireline, wireless, or a combination of both. As such, the above components may or may not be located at different geographical locations.

In one embodiment, data is stored and transferred in units of files in the data storage system 100. Therefore, the system 100 may be a file-based networked storage system. In such an embodiment, the system 100 can be a network-attached storage (NAS) system that provides clients with access to data at the file level. A NAS system uses file access protocols to retrieve data, such as, for example, Network File System (NFS), or Common Internet File System (CIFS). The files are logically arranged into directories. A volume of storage devices may be mapped to one or more directories. Alternatively, the system 100 may include or be part of a storage area network (SAN), to provide clients with access to data at the block level of storage servers. A block is the basic unit of data used to store data in the SAN. Alternatively, the data storage system 100 may provide clients with access to data at both the block level and the file level.

Note that any or all of the components of system 100 and associated hardware may be used in various embodiments of the present invention. However, it can be appreciated that other configurations of the networked data storage system may include more or fewer devices than those discussed above.

In one embodiment, the client machine 110 is used by a storage administrator, and thus, may be referred to as an administrative client. In contrast, the other client machines 112 and 114 are used by users of the network data storage system 100 to access data, and thus, may be referred to as storage clients. Of course, a storage client and an administrative client may not be mutually exclusive, that is, both the administrator and users may use the same client machine in some embodiments. The client machines 110, 112, and 114 may be implemented on personal computers (PCs), laptop computers, special purpose computing devices, etc.

Figure 2A:
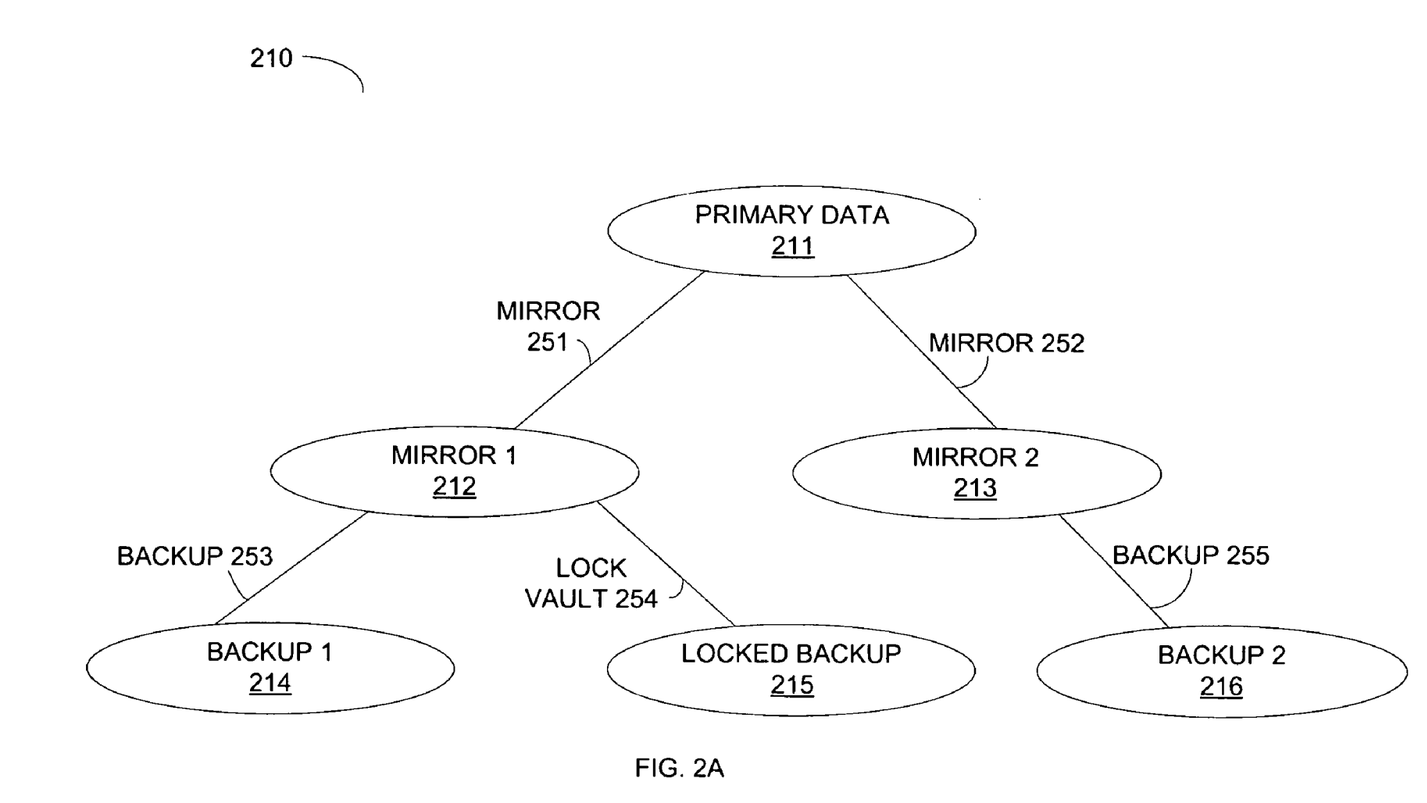
FIG. 2A shows a tree graph of one embodiment of a data management policy.

In one embodiment, the client machine 110 is coupled to the storage manager 120, which is further coupled to the storage manager database 130. The storage manager 120 is a software application which may be implemented on one or more servers, personal computers (PCs), special-purpose computing machines, etc. Details of one embodiment of a machine usable to implement the data manager 120 are shown in FIG. 2D. The storage manager 120 may include an application programming interface (API) 124 to interface with the client machine 110. Further, the storage manager 120 manages storage using entities called data sets. Details of data sets are discussed below. In one embodiment, the storage manager 120 creates a user interface (e.g., graphical user interface (GUI), command line interface (CLI), etc.) and provides the user interface to the client machine 110 via the API 124. The API 124 may be implemented on a separate server coupled between the storage manager 120 and the client machine 110. The client machine 110 includes a display (e.g., a monitor) to present the user interface (e.g., the GUI 118) to a storage administrator of the data storage system 100 (also commonly referred to as the administrator). Using the GUI 118, the administrator may input information of data sets and/or data management policies to the storage manager 120. In some embodiments, the GUI 118 is presented via a network access application, such as an internet browser, operable on the client machine 110.

Based on the administrator inputs, the storage manager 120 creates, removes, and/or updates data sets, where each data set is associated with a data management policy. Objects representing the data sets and the data management policy are stored in the storage manager database 130. Using the data sets and the data management policies, the storage manager 120 manages data in the networked data storage system 100. More details of the data sets, data management policies, and data management using data sets are discussed below.

In addition to the client machine 110 and the storage manager database 130, the storage manager 120 is further coupled to the storage server 160, the backup storage server 140, and the mirror storage server 150. It should be apparent that the storage servers 140, 150, and 160 are shown in FIG. 1 as examples of storage servers for illustrative purpose only. Other embodiments of the data storage system may include more or fewer storage servers, each storage server managing a set of physical storage devices, such as magnetic disks, optical disks, tape drives, etc., in different configurations. Referring back to FIG. 1, the storage server 160 manages two disks 162A and 162B. The disks 162A and 162B may hold various storage containers, either in whole or in part. A storage container is a logical unit for storing data, such as a file, a directory, a volume, a qtree (which is a subset of a volume, optionally associated with a space usage quota), a LUN, etc. For instance, the disk 162A holds two qtrees 164A and 164B. Alternatively, a disk may hold a part of a storage container. For example, a disk may hold part of a volume, where the volume spans multiple disks.

The client machines 112 and 114 may access data in the disks managed by the storage server 160. Note that the data may be stored in storage containers of different forms and/or structures, such as qtrees, directories, volumes, etc. For example, the client machine 112 stores data in the qtree 164A, while the client machine 114 stores data in the qtree 164B. To protect the data in the qtrees 164A and 164B, the storage server 160 may send the data in the qtrees 164A and 164B to the backup storage server 140, which creates a backup copy of the data in the qtrees 164A and 164B in the disk 142. In addition, the backup filer 140 may further mirror the disk 142 onto the disk 152 managed by the mirror storage server 150.

In some embodiments, the client machine 112 stores data in an internal disk (not shown) and have the internal disk backed up in the disk 142 managed by the backup filer 140.

One should appreciate that as the numbers of storage servers and storage devices grow in the data storage system 100, the workload as well as the complexity of data management increases. Thus, it becomes more difficult for the administrator to manually manage data in the system 100. In order to improve efficiency and to reduce the risk of making errors, the storage manager 120 automatically uses data sets to manage data in the data storage system 100 according to data management policies from the administrator. Details of data sets and the use of such are discussed below.

Data Sets and Storage Objects

To efficiently manage data, the storage manager 120 uses entities called data sets to manage data in some embodiments. In one embodiment, a data set includes a set of storage objects associated with a data management policy. The data management policy is applied to the storage objects in the data set, directing how the administrator wishes the data in the storage objects to be managed as a single unit. In other words, a data set is a collection of storage objects grouped by virtue of the storage objects to be managed as a single unit. For example, a storage object may be defined to be a home directory of an employee in a company, which is a member of a data set of the home directories of all employees in the company. The storage objects may be referred to as members of the data set. Before going further into the details of the data set and the data management policy, details of a storage object are described below.

A storage object may include a logical representation of a collection of data in one or more storage containers and replicas of the collection of data (e.g., a mirrored copy of the data and/or a backed up copy of the data). Referring back to the above example, a logical representation of the storage object of the employee's home directory may be the employee's identification (ID), such as "jsmith." The collection of data may be created by users or the administrator of the data storage system 100. In some embodiments, the data of a storage object is stored in a storage container or a set of storage containers (e.g., the disk 162A) managed by one or more storage servers (such as the storage server 160) in the data storage system 100.

Some examples of storage objects include data in qtrees, volumes, directories, etc. These examples may also be referred to as elementary storage objects because they are logical representation of data in basic units of storage in the data storage system 100 in the context of data sets. Further, a storage object may be a reference to a collection of elementary storage objects, such as a reference to all volumes on a storage server.

Note that the storage containers are independent of the logical representation of the data. Thus, the data is not managed by where the data is stored or how the data is accessed. Rather, the data is managed by the logical representation, which may be associated with the content of the data. For instance, the data may be a word processing document, "employee_review.doc" stored in the disk 162A. In the current example, the logical representation may be the name of the document (i.e., "employee_review.doc"). The storage manager 120 may manage the document by the name of the document (i.e., "employee_review.doc"), rather than by the storage container (i.e., the disk 162A in the current example) or the set of storage containers in which the document is stored. As such, the storage object, as well as the data set having the storage object, are not bound to any actual physical location or storage container and may move to another location or another storage container over time. For example, the storage containers associated with a data set may become obsolete in performance over time and the storage manager 120 may move the data to a set of new storage containers, with or without alerting the administrator. Any movement of data sets may be substantially transparent from a client perspective in order to provide a separation of the logical representation from the physical location of the data. Thus, the storage manager 120 may re-balance resources (e.g., the disks 162A, 162B, 142, and 152) in the data storage system 100 over time. In other words, the data set provides the virtualization of the physical storage containers used to hold the data.

Operations on Data Sets

In some embodiments, the storage manager 120 may perform various operations on a data set in response to administrator requests. Some examples of such operations include changing or modifying an associated data management policy of a data set, provisioning new members in a data set, listing members in a data set, adding members to a data set, deleting or removing members from a data set, migrating a data set to a different set of storage containers, generating performance views specific to a data set, generating storage usage reports of a data set, setting quota on a data set or individual members within a data set. One should appreciate that the above are merely illustrative examples of some of the operations the storage manager 120 may perform on data sets. The above list is not an exhaustive list of all of the possible operations.

Data Management Policy

As mentioned above, the storage objects in the data set are associated with a data management policy. In general, a data management policy includes a description of the desired behavior of the associated data set. For instance, a data management policy may describe how the storage should be used and configured. One exemplary data management policy is a data protection policy, which describes how storage objects in a data set should be protected. Other examples of data management policies include a performance management policy, a provisioning policy, etc. Attributes associated with a data management policy are abstracted at the highest level possible, allowing implementation of underlying technology to change over time without adversely impacting the administrator. Thus, the administrator may be shielded from the idiosyncrasies of various underlying implementations that allow the data set to use newer technology as it becomes available in an automated fashion.

In some embodiments, a data management policy may be represented by a tree graph having a number of nodes and branches. FIG. 2A shows a tree graph of one embodiment of a data management policy. The tree graph 210 includes nodes 211-216 and branches 251-255. Each node represents a storage object and is coupled to another node via a branch, which describes the relationship between the two corresponding storage objects. For example, branch 253 is marked as a "backup" connection between nodes 212 and 214. Thus, storage object represented by node 214 is a backup copy of the storage object 212. The graph 210 represents how the administrator intends to manage data in the data storage system.

In some embodiments, the data management policy describes attributes of the data in terms that the administrator is comfortable with, and leaves the configuration and choice of technologies to implement the policy to the storage manager 120. The attributes in the policies generally focus on desired data protection behaviors and configuration settings rather than on software technology and hardware choices. Although the choice of hardware may have some impact on the performance and cost of the storage, the physical equipment choices may be driven by a simple label scheme described in more detail below. Examples of the above-mentioned attributes include cost, performance, availability, reliability, type of data protection, capacity related actions, security settings, capabilities, etc.

Note that the data management policy associated with a data set may be explicitly changed by the administrator. For example, in a tiered storage system, as the data in tier-1 storage ages, the relevance or importance of the data may diminish, and thus, the data may be migrated to tier-2 storage from the tier-1 storage. In some embodiments, the administrator may determine which data sets are candidates for migration and associate such data sets with a policy created for data in tier-2 storage.

In some embodiments, once the administrator has added the desired members to the data set, the storage manager 120 automatically starts applying the data management policy associated with the data set to all members in the data set. For instance, the storage manager 120 may configure storage objects in the data set, schedule backup of the storage objects in the data set, etc., according to the data management policy. In response to a change in the data set and/or the data management policy, the storage manager 120 automatically checks the data set to determine if the data set still conforms to the policy and if not, the storage manager 120 may re-apply the policy to the data set to make the data set conform to the policy. For example, when the administrator adds a new member to a data set, the storage manager 120 automatically applies the data management policy associated with the data set to the new member. In another example, when the administrator alters a data management policy associated with a data set, the storage manager 120 automatically identifies the data set associated with the altered data management policy. To identify the affected data sets, the storage manager 120 may access the storage manager database 130 to find the data sets associated to the altered policy. Then the storage manager 120 automatically checks to determine if the storage objects in the data set still conform to the altered data management policy. If not, the storage manager 120 automatically applies the altered policy to the storage objects in the data set. For instance, the storage manager 120 may automatically re-configure the storage servers (e.g., storage servers 140, 150, 160) and/or the storage devices (e.g., disks 142, 152, 162A, 162B), as well as the relationships between the storage servers according to the altered policy.

In some embodiments, the storage manager 120 may also give the administrator a preview of what actions the storage manager 120 is configured to take to make the data set conform to the data management policy, so that the administrator can confirm the actions are correct before the actions are taken. In some embodiments, the storage manager 120 may find certain situations unresolvable and report these to the administrator for manual resolution.

With the above introduction to the concepts of data sets, storage objects, data management policies according to some embodiments of the invention, more details of some embodiments of the storage manager 120 and the process to make data sets conform to data management policies are described below.

Storage Manager

One embodiment of the storage manager 120 may be implemented on a server as illustrated in FIG. 2D. Referring to FIG. 2D, the storage manager 200 includes a processor 222, a memory 224, a network interface 226, and a storage adaptor 228, which are coupled to each other via a bus system 230. The bus system 230 may include one or more busses and/or interconnects. The storage manager 200 communicates with a network (e.g., the Internet) via the network interface 226, which can be an Ethernet adaptor, fiber channel adaptor, etc. The network interface 226 may be coupled to a public network, a private network, or a combination of both in order to communicate with a client machine (such as the client machine 110 in FIG. 1) usable by an administrator of the data storage system.

In one embodiment, the processor 222 reads instructions from the memory 224 and executes the instructions. The memory 224 may include any of various types of memory devices, such as, for example, random access memory (RAM), read-only memory (ROM), flash memory, one or more mass storage devices (e.g., disks), etc. The memory 224 stores instructions of an operating system 230. The processor 222 may retrieve the instructions from the memory 224 to run the operating system 230. The storage manager 200 interfaces with one or more storage servers (e.g., the storage servers 140, 150, 160 in FIG. 1) via the storage adaptor 228, which may include a small computer system interface (SCSI) adaptor, fiber channel adaptor, etc.

Conformance Checker and Conformance Engine

Figure 3:
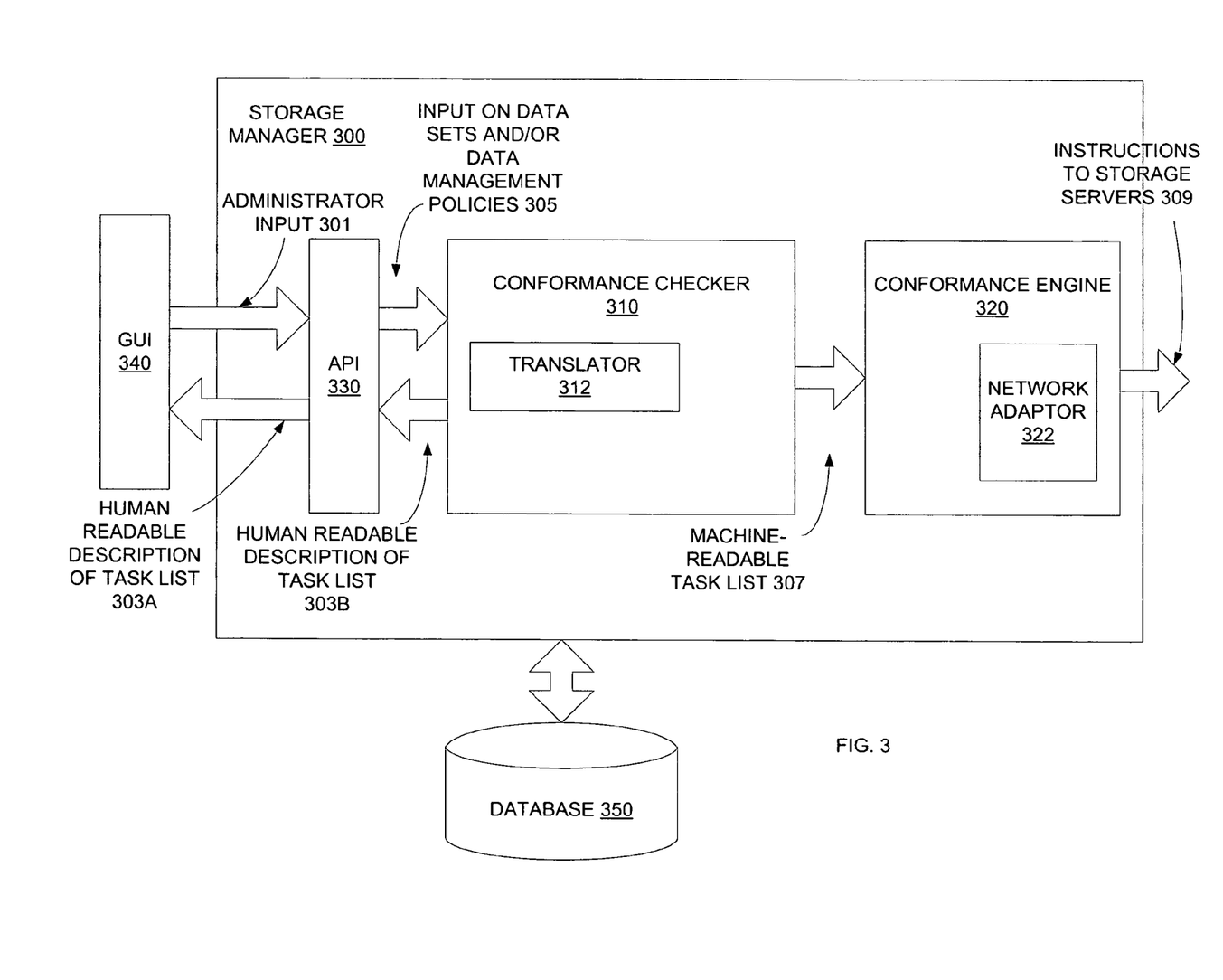
FIG. 3 illustrates a functional diagram of an embodiment of a storage manager.

FIG. 3 illustrates a functional diagram of one embodiment of a storage manager 300, which can represent storage manager 120 in FIG. 1. The storage manager 300 includes an API 330, a conformance checker 310, and a conformance engine 320. The API 330 is operatively coupled to the conformance checker 310, which is further operatively coupled to the conformance engine 320. The conformance checker 310 includes a translator 312. The conformance engine 320 includes a storage adaptor 322. The API 330 is communicably coupled to a GUI 340, which may be provided by a client machine (e.g., the client machine 110 in FIG. 1). The storage manager 300 is coupled to a database 350, which stores representations of data sets and data management policies, which are also referred to as objects. In general, the conformance checker 310 checks whether the storage objects of a data set conforms to a data management policy associated with the data set. To conform to the data management policy, the storage objects of the data set has to have relationships with each other as specified by the data management policy. In other words, the data set violates the data management policy if the storage objects are not related to each other as specified in the data management policy. For example, a data set includes three volumes, namely, volume A, volume B, and volume C. The data set is associated with a data management policy, which is a protection policy that specifies some backup and mirroring relationships between the volumes. Specifically, the protection policy specifies that volume A should be backed up on volume B and volume B should be mirrored to volume C. Then the data set conforms to the protection policy if volume A is backed up on volume B and volume B is mirrored to volume C. On the other hand, the data set violates the protection policy if volume A is not backed up on volume B, and/or volume B is not mirrored to volume C. Of course, the data management policy (which, in this case, is the protection policy) may specify more details on the relationships between the storage objects (e.g., the frequencies of backup and mirroring). More details on how the conformance checker 310 determines if a data set conforms or violates a data management policy are described below.

In some embodiments, the GUI 340 receives administrator inputs 301 on data sets and/or data management policies. The administrator inputs 301 may include, for example, a request to apply a data management policy to a data set, a change to an existing data management policy and/or an existing data set, to request to create a new data management policy and/or a new data set, etc. The administrator inputs 301 are typically written in human readable terms, such as words, phrases, etc., in a structured, machine-readable format. The API 330 receives the administrator inputs 301 from the GUI 340 and forwards the inputs 305 to the conformance checker 310.

The translator 312 in the conformance checker 310 translates the administrator inputs 301 into machine-readable terms. In some embodiments, a client program running on a client machine (e.g., the client machine 110 in FIG. 1) invokes the API 330, which may construct an in-memory representation of the data set and its associated data protection policy, which are commonly referred to as objects. Note that these objects are software entities distinct from the storage objects described above. Then the API 330 invokes the main entry point in the conformance checker 310 with pointers to the objects corresponding to the data set and policy. The conformance checker 310 then compares the state of the data set against the data management policy to determine if the data set conforms to the data management policy. For example, the conformance checker 310 iterates through the connections of a tree graph representing the policy as applied to the data set. Referring back to FIG. 2A, the conformance checker 310 iterates through the connections represented by branches 251-255. For instance, the conformance checker 310 may iterate through the tree graph 210 from branch 251 to branch 252, then to branches 253, 254, and 255. Alternatively, the conformance checker 310 may iterate through the tree graph 210 from branch 251 to branches 253 and 254, and then to branch 252, and finally to branch 255. For each connection, the conformance checker 310 compares the states of the storage objects represented by the nodes 211-216 by making various determinations. A flowchart showing the determinations made by the conformance checker 310 according to one embodiment of the invention is shown in FIGS. 2B and 2C.

Figure 2B:
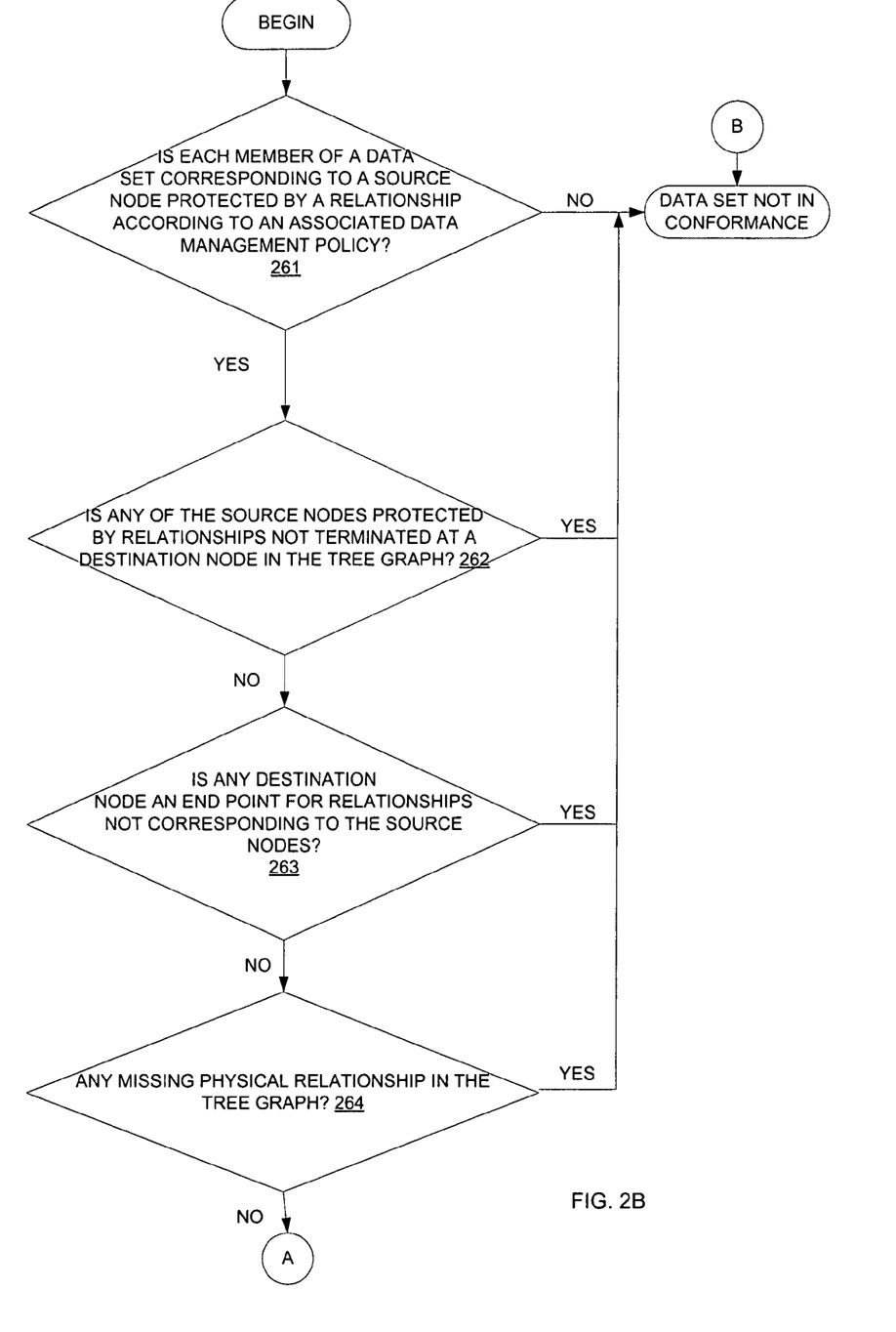
FIGS. 2B and 2C illustrate a flow diagram of one embodiment of a process performed by a conformance checker to determine if a data set is in conformance with a data management policy.

Referring to FIG. 2B, the conformance checker 310 determines if each member of the data set corresponding to a source node of the tree graph is protected by a relationship between storage servers according to the policy (block 261). For instance, the conformance checker 310 may look into a configuration file of the data storage system to find out the relationships between the storage servers managing the storage objects. For example, the policy may require volume A to be mirrored to volume B, where volume A is on storage server A and volume B is on storage server B. Then the conformance checker 310 may look into the configuration file of the data storage system to determine if storage server A mirrors volume A onto volume B on storage server B. In other words, the conformance checker 310 may check whether there is a mirroring relationship between storage server A and storage server B. If not, then the data set is not in conformance. Otherwise, the conformance checker 310 continues at block 262 to determine if there are any source nodes protected by relationships that do not terminate at a destination node of the tree graph. If there are, then the data set is not in conformance. Otherwise, the conformance checker 310 determines if there are any destination nodes that are end points for relationships not corresponding to the source node (block 263). If there are, then the data set is not in conformance. Next, the conformance checker 310 determines if there is a missing physical relationship in the tree graph (block 264). If there is, then the data set is not in conformance. Otherwise, the process continues in FIG. 2C.

Figure 2C:
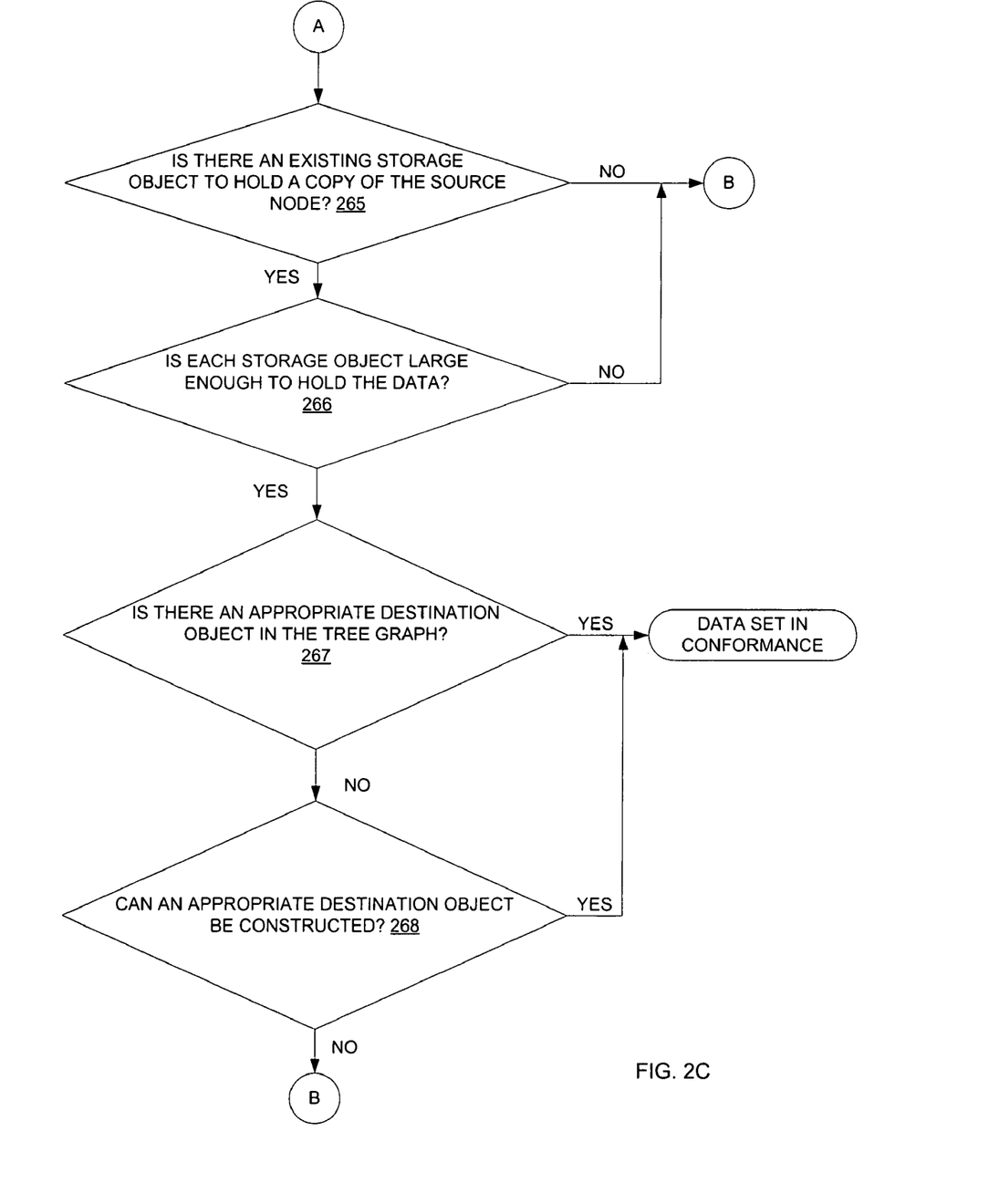
Figure 2D:
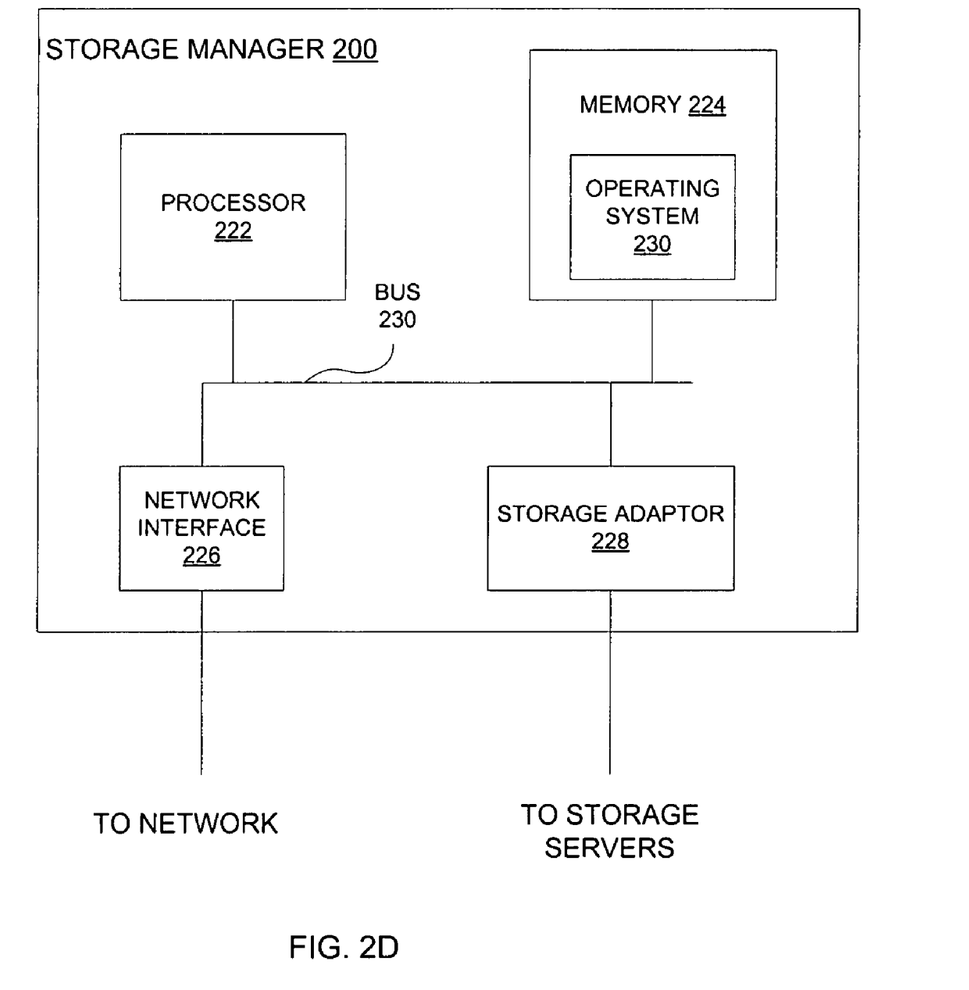
FIG. 2D illustrates an embodiment of a storage manager.

Referring to FIG. 2C, the conformance checker 310 determines if there is an existing storage object already in the data set to hold a copy of the source node (block 265). If not, the data set is not in conformance. Otherwise, the conformance checker 310 determines if the storage object is large enough to hold the data (block 266). If not, the data set is not in conformance. Next, the conformance checker 310 determines if there is an appropriate destination object (block 267). If so, the data set is in conformance. Otherwise, the conformance checker 310 determines if an appropriate destination object can be constructed (block 268). If so, the data set is in conformance. Otherwise, the data set is not in conformance.

When the conformance checker 310 determines that the data set is not in conformance with the data management policy, the conformance checker 310 generates a task or a set of tasks, which is for making the data set conform to the data management policy. A task includes one or more specific machine-executable or machine-readable instructions to cause a storage server to perform a specific function, such as to create a storage object, to create a relationship between a set of storage objects, to delete a storage object, etc. For example, when the conformance checker 310 determines that the data set is not in conformance with the data management policy because there is no existing storage object in the data set to hold a source node, the conformance checker 310 may generate a task including instructions to provision storage in order to create a new storage object. The task may further include the parameters of what needs to be done in order to make the data set conform to its policy. Some of the above questions may lead to situations unresolvable by the conformance checker 310. For example, if the data set does not contain enough storage objects for the destination node of a connection, the conformance checker 310 cannot resolve this issue unless the administrator supplies more storage objects. The tasks corresponding to these situations are considered unresolvable. Other tasks are resolvable, meaning that the conformance checker 310 has enough information to decide on the appropriate corrective action. The conformance checker 310 puts the tasks generated into a task list.

In some embodiments, the translator 312 translates the task list into human readable description 303B, which is sent to the API 330 from the conformance checker 310. For example, each task is associated with a specific piece of code to translate the task into a corresponding human readable description. The API 330 forwards the human readable description 303A of the task list to the GUI 340, which outputs the human readable description 303A of the task list to the administrator. For example, the GUI 340 may output the human readable description 303A of the task list in a screen display. The administrator may verify the human readable description 303A of the task list and if correct, the administrator may confirm that the human readable description 303A of the task list is correct via the GUI 340. These descriptions allow a user to see a "dry run" of the conformance checker 310. The administrator may accept the dry run results or cancel the operation. These dry run results are why it is useful to send modified copies of either the data set or policy objects to the conformance checker 310. The administrator may provisionally make changes to these objects and then invoke the conformance checker 310. The dry run results indicate what would have to be done should the administrator commit the changes to the data storage system. Since some changes may be relatively disruptive, allowing the administrator to see the impact of the changes before implementing the changes gives the administrator a safety net against making such disruptive changes.

Upon receipt of confirmation from the administrator, the conformance checker 310 may forward the machine-readable task list 307 to the conformance engine 320. The conformance engine 320 processes tasks in the list 307 in sequence, for example, first-in-first-out (FIFO), sending the appropriate commands or instructions 309 to storage servers (e.g., the storage servers 140, 150, 160 in FIG. 1) to re-configure the storage system to comply with the policy. Note that the conformance engine 320 is not making decisions based on the policy, rather, the conformance engine 320 is simply processing the tasks on behalf of the conformance checker 310. As such, the conformance engine 320 does not change the sequence of the tasks in the list 307.

In some embodiments, the conformance engine 320 includes a network adaptor 322 to interface with one or more storage servers in the data storage system, such as storage servers 140, 150, and 160 in FIG. 1. The storage servers are managed by the storage manager 300. The network adaptor 322 may issue the instructions in the task list 307 to the relevant storage servers to cause the storage servers to perform functions according to the instructions in order to make the data set to conform to the data management policy. For example, the instructions from the storage manager 300 may cause a storage server to schedule data backup according to the data management policy, to reconfigure some storage objects managed by the storage server according to the data management policy, to re-allocate storage devices according to the data management policy, etc. When the tasks have completed execution, the storage manager 300 has made the data set conform to the data management policy.

Advantages of Using Conformance Checker and Conformance Engine

As discussed above, storage administrators conventionally describe data management policies in some non-machine readable form (e.g., in English text) and then manually check the storage system configuration against the policy to see if there are any issues. Using the storage manager 300 described above to verify that policy is being implemented correctly has many benefits over the conventional approach.

First, the storage manager 300 described above provides great convenience to the administrator. Since the conformance checker 310 of the storage manager 300 automatically checks for conformance, the data sets in the data storage system can be checked faster and more frequently. This may help to detect issues much sooner than having the administrator to manually check the data sets. Further, if the conformance checker 310 detects an issue, the administrator does not have to manually enter commands to resolve the situation. Rather, the conformance checker 310 generates a list of tasks, which may be executed to make the data sets conform to the data management policy. Manually entering commands or instructions is tedious and error prone. Thus, the storage manager 300 helps to reduce risk in making errors when changing a data management policy.

Moreover, splitting the conformance process into two stages, supported by the conformance checker 310 and the conformance engine 320 respectively, allows the administrator to find out what tasks would be executed before any expensive or irreversible actions are taken. The administrator may cancel tasks before they are executed, should the administrator decide not to accept the tasks recommended by the conformance checker 310. Further, should the administrator decide to change a data protection policy, the conformance checker 310 may identify all the data sets using that policy and deduce the operations needed to bring the data sets into conformance. As mentioned above, this may be considered as a dry run of the change in the data management policy. Previewing the dry run allows the administrator to decide whether such a change is too disruptive or expensive before implementing the change in the data management policy.

Operations to Make Data Sets Conform to Data Management Policies

Figure 4:
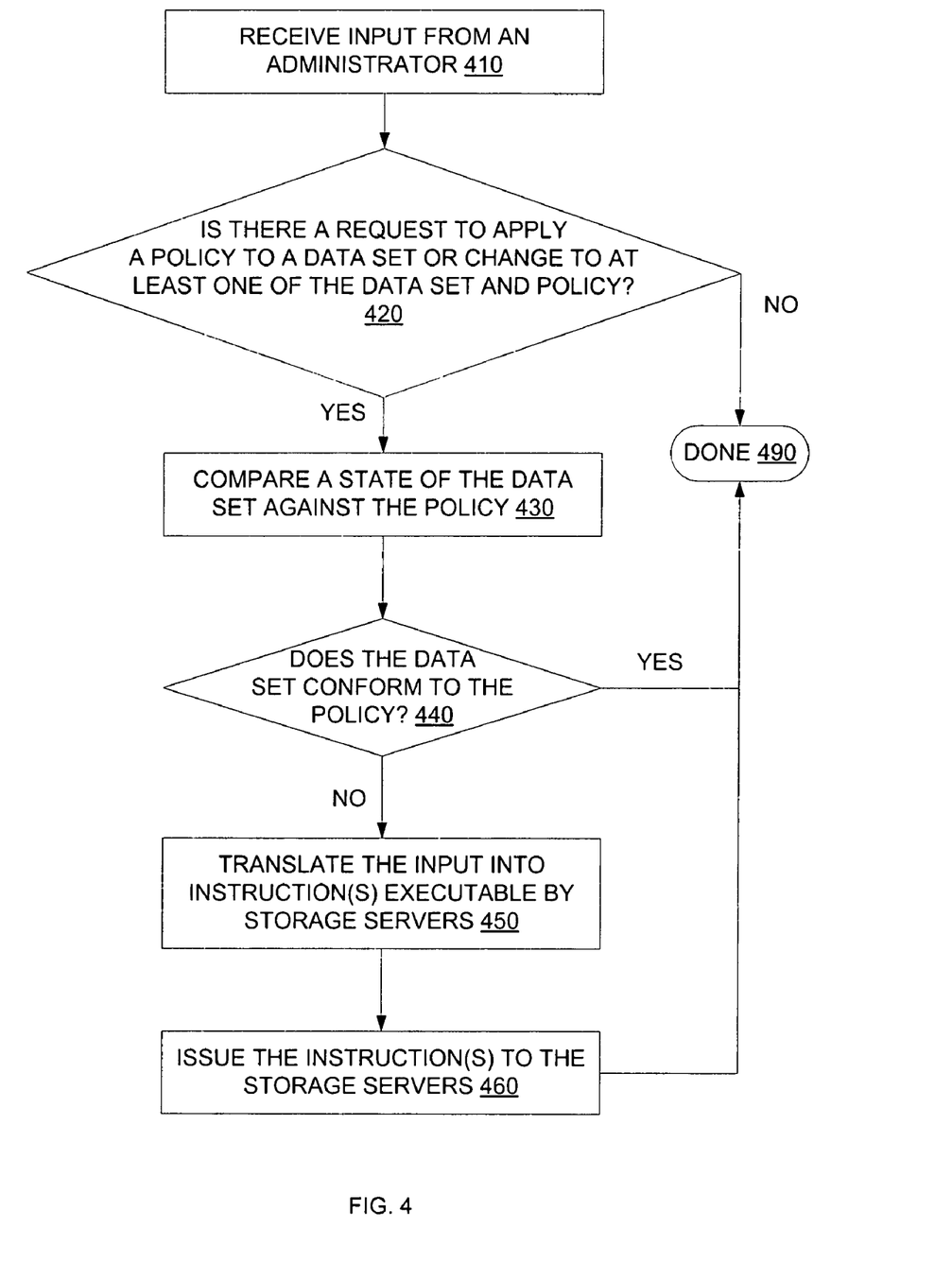
FIG. 4 illustrates a flow diagram of an embodiment of a process to make a data set conform to a data management policy.

FIG. 4 illustrates a flow diagram of one embodiment of a process to manage data in a data storage system using data sets. The process is performed by processing logic that comprises hardware (e.g., circuitry, dedicated logic, etc.), software (such as is run on a general-purpose computer system or a dedicated machine, such as the storage manager 120 in FIG. 1), firmware, or any combination of these.

Referring to FIG. 4, processing logic receives input from an administrator of the data storage system (processing block 410). Processing logic then checks if there is a request to apply a data management policy to a data set or change to at least one of the data management policy and the data set (processing block 420). If there is no request or change, then processing logic transitions to processing block 490 and the process ends. Otherwise, processing logic transitions to processing block 430.

In some embodiments, processing logic compares a state of the data set against the data management policy (processing block 430). Then processing logic checks if the data set conforms to the policy (processing block 440). If so, then processing logic transitions to processing block 490 and the process ends. Otherwise, processing logic transitions to processing block 450.

Processing logic then translates the input from the administrator into instructions executable by storage servers (processing block 450). In some embodiments, these instructions are translated back into a human readable task list and output to the administrator for verification. The administrator may accept or reject the task list. If the administrator accepts the task list, processing logic may issue the instructions to the storage servers to cause the storage servers to take actions that would bring the storage objects into conformance with the policy (processing block 460). Then processing logic transitions to processing block 490 and the process ends. Details of some embodiments of the above operations have been described above.

Some portions of the preceding detailed description are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a machine-accessible medium, also referred to as a computer-readable medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A storage manager comprising:
    a conformance checker configured to
        compare a state of a data set against a data management policy associated with the data set to determine if the data set conforms to the data management policy, the data set comprising a plurality of storage objects, wherein the data management policy specifies a mirroring relationship between a first storage object and a second storage object of the data set, and
        if the conformance checker determines that the data set does not conform to the data management policy, generate a task including instructions to make the data set conform to the data management policy, wherein the instructions comprise creating the mirroring relationship between the objects of the data set; and
    a conformance engine coupled to the conformance checker, the conformance engine configured to execute the instructions in the task to make the data set conform to the data management policy.

2. The storage manager of claim 1, further comprising:
    an application programming interface (API) to interface with a client machine to receive input from an administrator, wherein the conformance checker compares the state of the data set against the data management policy in response to the input.

3. The storage manager of claim 2, wherein the input includes a request from the administrator to apply the data management policy to the data set.

4. The storage manager of claim 2, wherein the input includes a change to at least one of the data set and the data management policy.

5. The storage manager of claim 2, wherein the conformance checker comprises a translator to translate the input from the administrator into instructions executable by a storage server to make the data set conform to the data management policy.

6. The storage manager of claim 5, wherein the conformance engine comprises a storage adaptor to couple to the storage server and the conformance engine is operable to issue the instructions to the storage server via the storage adaptor.

7. The storage manager of claim 6, wherein the data set includes a plurality of storage objects associated with the data management policy, wherein each of the plurality of storage objects includes a representation of data stored in storage containers, wherein the storage containers are independent of the representation.

8. A data storage system comprising the storage manager of claim 7, the data storage system further comprising the storage server.

9. The data storage system of claim 8, further comprising:
    a client machine coupled to the API to provide a graphical user interface (GUI) to receive the input from the administrator.

10. A machine-implemented method comprising:
    comparing a state of a data set against a data management policy associated with the data set to determine if the data set conforms to the data management policy, the data set comprising a plurality of storage objects, wherein the data management policy specifies a mirroring relationship between a first storage object and a second storage object of the data set;
    if it is determined that the data set does not conform to the data management policy, generating a task including instructions to make the data set conform to the data management policy, wherein the instructions comprise creating the mirroring relationship between the objects of the data set; and
    causing a storage server to execute the instructions in the task to make the data set conform to the data management policy.

11. The method of claim 10, further comprising:
    receiving input from an administrator, wherein the comparing the state of the data set against the data management policy is performed in response to the input.

12. The method of claim 11, wherein the input includes a request from the administrator to apply the data management policy to the data set.

13. The method of claim 11, wherein the input includes a change to at least one of the data set and the data management policy.

14. The method of claim 11, further comprising:
    translating the input from the administrator into instructions executable by the storage server to carry out the task.

15. The method of claim 14, wherein causing the storage server to execute the task comprises:
    issuing the instructions to the storage server.

16. The method of claim 10, wherein the data set includes a plurality of storage objects associated with the data management policy, wherein each of the plurality of storage objects includes a representation of data stored in storage containers, wherein the storage containers are independent of the representation.

17. The method of claim 10, wherein said comparing is performed periodically.

18. A machine-accessible medium that stores instructions which, if executed by a processor, will cause the processor to perform operations comprising:
    generating a plurality of tasks to apply a data management policy to a data set including a plurality of storage objects in response to a request from an administrator, wherein the data management policy specifies a mirroring relationship between a first storage object and a second storage object of the data set, wherein the generating is performed after comparing a state of the data set against the data management policy and if it is determined that the data set does not conform to the data management policy;

generating a plurality of instructions executable by the storage server to carry out the plurality of tasks, wherein the instructions comprise creating the mirroring relationship between the objects of the data set;

outputting information identifying the plurality of tasks in a human-readable form to the administrator for verification; and causing a storage server to execute the plurality of tasks in response to receiving a confirmation from the administrator, wherein the tasks make the data set conform to the data management policy.

19. The machine-accessible medium of claim 18, wherein the request includes a change to at least one of the data set and the data management policy.

20. The machine-accessible medium of claim 18, wherein causing the storage server to execute the plurality of tasks comprises:

issuing the plurality of instructions to the storage server.

21. The machine-accessible medium of claim 20, wherein each of the plurality of storage objects includes a representation of data stored in storage containers, wherein the storage containers are independent of the representation.

* * * * *